United States Patent
Chen et al.

(10) Patent No.: US 11,409,531 B2
(45) Date of Patent: Aug. 9, 2022

(54) PROCESSOR HAVING MULTIPLE OPERATING MODES

(71) Applicant: ALIBABA GROUP HOLDING LIMITED, Grand Cayman (KY)

(72) Inventors: Chen Chen, Shanghai (CN); Taotao Zhu, Hangzhou (CN); Chang Liu, Shanghai (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 54 days.

(21) Appl. No.: 16/828,528

(22) Filed: Mar. 24, 2020

(65) Prior Publication Data
US 2020/0310808 A1 Oct. 1, 2020

(30) Foreign Application Priority Data
Mar. 27, 2019 (CN) .......................... 201910238090.0

(51) Int. Cl.
*G06F 9/30* (2018.01)
*G06F 9/50* (2006.01)
(Continued)

(52) U.S. Cl.
CPC ...... *G06F 9/30189* (2013.01); *G06F 9/30101* (2013.01); *G06F 9/321* (2013.01); *G06F 9/3877* (2013.01); *G06F 9/5027* (2013.01)

(58) Field of Classification Search
CPC .. G06F 9/30189; G06F 9/30101; G06F 9/321; G06F 9/3877
See application file for complete search history.

(56) References Cited

U.S. PATENT DOCUMENTS

| | | | | |
|---|---|---|---|---|
| 3,858,182 A | * | 12/1974 | Delagi | G06F 9/462 726/16 |
| 7,523,229 B2 | * | 4/2009 | Hatakeyama | G06F 13/28 710/22 |

(Continued)

FOREIGN PATENT DOCUMENTS

CN 107103251 A 8/2017

OTHER PUBLICATIONS

International Search Report and written opinion in related International Application No. PCT/US2020/024459, dated Jun. 24, 2020 (11 pgs).

(Continued)

*Primary Examiner* — Corey S Faherty
(74) *Attorney, Agent, or Firm* — Finnegan, Henderson, Farabow, Garrett & Dunner, LLP

(57) ABSTRACT

Disclosed is a processor having multiple operating modes, comprising: a first mode resource storage circuitry configured to store first mode resources when the processor is operating in a first mode, wherein the first mode resource storage circuitry comprises a resource mapping circuitry configured to provide second mode resources to the processor operating in the first mode; a second mode resource storage circuitry configured to store the second mode resources when the processor is operating in a second mode; and an access control interface communicatively coupled to the resource mapping circuitry and the second mode resource storage circuitry, the access control interface configured to provide the resource mapping circuitry with an access to the second mode resource storage circuitry.

20 Claims, 5 Drawing Sheets

(51) Int. Cl.
    *G06F 9/38*          (2018.01)
    *G06F 9/32*          (2018.01)

(56) References Cited

U.S. PATENT DOCUMENTS

| | | | |
|---|---|---|---|
| 10,853,480 B2 * | 12/2020 | Sandoval | G06F 11/302 |
| 2013/0283017 A1 | 10/2013 | Wiikerson et al. | |
| 2016/0077872 A1 * | 3/2016 | Gu | G06F 9/545 |
| | | | 718/102 |
| 2017/0126738 A1 | 5/2017 | Wilkerson et al. | |
| 2021/0011856 A1 * | 1/2021 | Xia | G06F 9/45545 |

OTHER PUBLICATIONS

European Patent Office Communication issued for Application No. 20779533.7 which encloses the extended European Search Report which includes pursuant to Rule 62 EPC, the Supplementary European Search Report (Art. 153(7) EPC) and the European search opinion, dated Apr. 8, 2022, 18 pages.

\* cited by examiner

PROCESSOR HAVING MULTIPLE OPERATING MODES

CROSS REFERENCE TO RELATED APPLICATION

This disclosure claims the benefits of priority to Chinese application number 201910238090.0, filed Mar. 27, 2019, which is incorporated herein by reference in its entirety.

BACKGROUND

Processors may operate in different modes, such as superuser mode and ordinary user mode. When a processor is in the superuser mode, it may gain more processor permissions and access more processor resources. Executing a general application program in the ordinary user mode in a processor and operating an operating system kernel in the superuser mode can increase the security of the processor. But existing mode switching methods cause a relatively high overhead for the access process and are not efficient.

SUMMARY

Embodiments of the present disclosure provides a processor having multiple operating modes, comprising: a first mode resource storage circuitry configured to store first mode resources when the processor is operating in a first mode, wherein the first mode resource storage circuitry comprises a resource mapping circuitry configured to provide second mode resources to the processor operating in the first mode; a second mode resource storage circuitry configured to store the second mode resources when the processor is operating in a second mode; and an access control interface communicatively coupled to the resource mapping circuitry and the second mode resource storage circuitry, the access control interface configured to provide the resource mapping circuitry with an access to the second mode resource storage circuitry.

Embodiments of the present disclosure further provides a system on chip, comprising a processor configured to operate in multiple operating modes, comprising: a first mode resource storage circuitry configured to store first mode resources when the processor is operating in a first mode, wherein the first mode resource storage circuitry comprises a resource mapping circuitry configured to provide second mode resources to the processor operating in the first mode; a second mode resource storage circuitry configured to store the second mode resources when the processor is operating in a second mode; and an access control interface communicatively coupled to the resource mapping circuitry and the second mode resource storage circuitry, the access control interface configured to provide the resource mapping circuitry with an access to the second mode resource storage circuitry.

Embodiments of the present disclosure further provides a processor configured to operate in multiple operating modes, the processor comprising an ordinary user mode stack pointer register configured to store a stack pointer when the processor is operating in an ordinary user mode; a superuser mode register bank configured to store values of registers when the processor is operating in a superuser mode, the superuser register bank comprising a map register configured to provide the ordinary user stack pointer to the processor when the processor is operating in the superuser mode; and an access control interface communicatively coupled to the map register and the ordinary user stack pointer register, the access control interface configured to provide the map register with an access to the ordinary user stack pointer register.

Embodiments of the present disclosure further provides a system on chip, comprising a processor configured to operate in multiple operating modes, comprising: an ordinary user mode stack pointer register configured to store a stack pointer when the processor is operating in an ordinary user mode; a superuser mode register bank configured to store values of registers when the processor is operating in a superuser mode, the superuser register bank comprising a map register configured to provide the ordinary user stack pointer to the processor when the processor is operating in the superuser mode; and an access control interface communicatively coupled to the map register and the ordinary user stack pointer register, the access control interface configured to provide the map register with an access to the ordinary user stack pointer register.

Embodiments of the present disclosure further provides a processor configured to operate in multiple operating modes, comprising a non-trusted world register bank configured to store values of registers when the processor is operating in a non-trusted world mode; a trusted world register bank configured to store values of registers when the processor is in operating a trusted world mode, the trusted world register bank comprising a map register configured to provide the values of non-trusted world registers in the non-trusted world register bank to the processor when the processor is operating in the trusted world mode; and an access control interface communicatively coupled to the map register and the non-trusted world register, the access control interface configured to provide the map register with an access to the non-trusted world register.

Embodiments of the present disclosure further provides a system on chip, comprising processor configured to operate in multiple operating modes, comprising: a non-trusted world register bank configured to store values of registers when the processor is operating in a non-trusted world mode; a trusted world register bank configured to store values of registers when the processor is in operating a trusted world mode, the trusted world register bank comprising a map register configured to provide the values of non-trusted world registers in the non-trusted world register bank to the processor when the processor is operating in the trusted world mode; and an access control interface communicatively coupled to the map register and the non-trusted world register, the access control interface configured to provide the map register with an access to the non-trusted world register.

DETAILED DESCRIPTION

To make the objectives, technical solutions and advantages of the embodiments of the present disclosure clearer, the technical solutions in the embodiments of the present disclosure are described below with reference to the accompanying drawings in the embodiments of the present disclosure. Obviously, the described embodiments are merely some rather than all of the embodiments of the present disclosure. Based on the embodiments in the present disclosure, all other embodiments obtained by those with ordinary skill in the art without creative efforts should fall within the protective scope of the present disclosure.

To enhance processor security, a new trusted world status can be added to the operating modes of the processor. The trusted world status can be a safe and reliable operating mode in which sensitive, important hardware and software resources in processors in trusted worlds, system IPs of trusted attributes, and other systems can be configured to become a part of the trusted worlds. Hardware mechanisms can be utilized to ensure that resources in the trusted worlds can only be accessed by members of the trusted worlds, thus isolating the trusted worlds from non-trusted worlds and further ensuring the confidentiality and integrity of secure resources.

In a processor architecture that supports operation in multiple modes, a processor can provide resources, such as a register bank, for each mode specifically. As a result, the processor operating in one operating mode may not directly access various processor resources in other operating modes, thereby ensuring the security of the processor. To access processor resources in other operating modes, the processor may need to perform mode switching to access processor resources in other modes.

For an operating mode with higher authority, processor resources in an operating mode with lower authority should be accessible under the permission of the authority. Existing technologies often rely on mode switching methods, which can cause a high overhead for the access process. Therefore, a more direct and efficient method is desired so that the processor in a higher-authority operating mode may directly access the processor resources in a low-authority operating mode.

Figure 1:
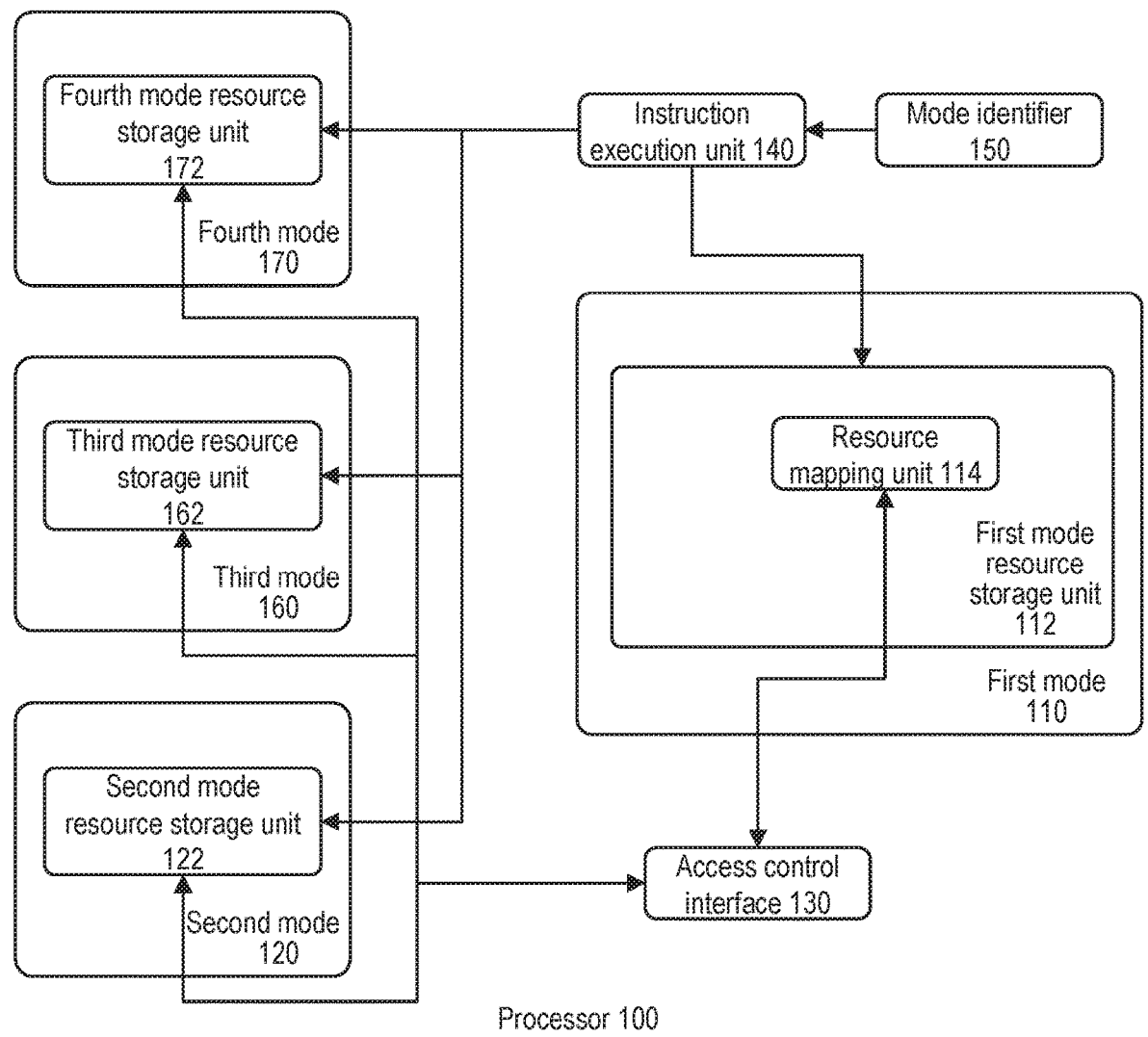
FIG. 1 is a schematic diagram of a processor configured to operate in different modes, according to some embodiments of the present disclosure.

FIG. 1 is a schematic diagram of a processor configured to operate in different modes, according to some embodiments of the present disclosure. As shown in FIG. 1, a processor 100 can operate in a first mode 110 and a second mode 120. Depending on the structural design of processor 100, processor 100 may define operating modes in a variety of ways. In some embodiments, the operating modes of processor 100 may comprise a first mode 110 and a second mode 120 according to the identity of the instruction execution. In some embodiments, first mode 110 and second mode 120 can be a superuser operating mode and an ordinary user operating mode, respectively. In some embodiments, first mode 110 and second mode 120 can be a trusted world mode and a non-trusted world mode, respectively, according to an instruction execution environment.

The present disclosure is not limited to specific division forms of the modes, and the above-mentioned execution modes may be further combined to form more execution modes. For example, trusted world mode and non-trusted world mode may further comprise a trusted world superuser operating mode, a trusted world ordinary user operating mode, a non-trusted world superuser operating mode, and a non-trusted world ordinary user operating mode. All manners in which various different operating modes can be defined in the processor are within the scope of the present disclosure.

When processor 100 is operating in an operating mode, processor 100 can provide for the operating mode resources that are available in this mode. For example, as shown in FIG. 1, processor 100 can include a first mode resource storage unit 112 in a first mode 110 and a second mode resource storage unit 122 in a second mode 120. In some embodiments, first mode resource storage unit 112 or second mode resource storage unit 122 can comprise circuitries.

First mode resource storage unit 112 can store resources when processor 100 is operating in first mode 110, and second mode resource storage unit 122 can store resources when processor 100 is operating in second mode 120. Processor 100 may provide various resources, such as various registers, including a general-purpose register for temporarily storing data, a general-purpose vector register for vector calculation, a control register, or a stack pointer register. Processor 100 may also provide a memory space dedicated to a certain mode, such as a stack associated with one mode. The present disclosure is not limited to the specific content of the resources, and all resources dedicated to a specific operating mode are within the scope of the present disclosure.

The resources provided by the processor in first mode 110 and the resources provided in second mode 120 may be different. In the case where first mode 110 has a higher authority than that of second mode 120, the processor may provide more resources in first mode 110 than resources provided in second mode 120. For example, when first mode 110 is the superuser operating mode and second mode 120 is the ordinary user operating mode, in addition to providing resources for stack pointers in both first mode 110 and second mode 120 (e.g., first mode resource storage unit 112 includes a superuser mode stack pointer register for a superuser mode stack pointer and second mode resource storage unit 122 includes an ordinary user mode stack pointer register for an ordinary user mode stack pointer), processor 100 can also provide, in first mode 110, a plurality of registers for storing processor field contents when processor 100 has an exception. For example, first mode resource storage unit 112 can further include a register for saving an exception entry base address. In some embodiments, in order to directly access the processor resources from second mode 120 in first mode 110 that has a higher authority, first mode resource storage unit 112 can further include a resource mapping unit 114. In some embodiments, Resource mapping unit 114 can provide the content stored in second mode resource storage unit 122. In some embodiments, resource mapping unit 114 can comprise circuitries. Resource mapping unit 114 can provide an access interface to second mode resource storage unit 122. In other words, resource mapping unit 114 can map to second mode resource storage unit 122. When resource mapping unit 114 is accessed in first mode 110, the content in second mode resource storage unit 122 may be accessed. For example, in first mode 110, the content in resource mapping unit 114 may be read, so that the content in second mode resource storage unit 122 is read. When some content is written into resource mapping unit 114, a corresponding content may be written into second mode resource storage unit 122.

In some embodiments, to facilitate execution of the processor and instruction operations, resource mapping unit 114 may be in the same form as that of second mode resource storage unit 122. For example, when second mode resource storage unit 122 is a register, resource mapping unit 114 may also take a form of a register. When second mode resource storage unit 122 is a segment of memory space, resource mapping unit 114 may also be in a form of a segment of memory space. In some embodiments, second mode resource storage unit 122 can be a collection of a variety of memory types (e.g., a register, a segment of memory space, etc.), and resource mapping unit 114 may also be in a form of the same collection of the variety of memory types.

In some embodiments, processor 100 can provide multiple resources in both first mode 110 and second mode 120. Resource mapping unit 114 may map some of the resources as needed. In other words, resource mapping unit 114 may map one or more units in second mode resource storage units 122. For example, when first mode 110 is a superuser operating mode and second mode 120 is an ordinary user operating mode, resource mapping unit 114 may map the ordinary user mode stack pointer register in second mode resource storage unit 122, so that the stack pointer in the ordinary user mode may be accessed in the superuser mode.

In some embodiments, to enable resource mapping unit 114 to map second mode resource storage unit 122, processor 100 can further include an access control interface 130. Access control interface 130 can be communicatively coupled to resource mapping unit 114 and second mode resource storage unit 122, and access control interface 130 can provide resource mapping unit 114 with access to second mode resource storage unit 122. As a result, when processor 100 is operating in first mode 110 and the content of resource mapping unit 114 is read, the content in second mode 120 stored in second mode resource storage unit 122 is read via access control interface 130. When some content is written into resource mapping unit 114, corresponding content in second mode 120 is written into second mode resource storage unit 122 via access control interface 130.

Access control interface 130 can be implemented in a variety of ways. In some embodiments, if processor 100 can only operate in either a trusted world mode or a non-trusted world mode, access control interface 130 may obtain a storage location of second mode resource storage unit 122 in the memory space before switching from second mode 120 to first mode 110, and associate the storage location with resource mapping unit 114 when processor 100 operates in first mode 110. For example, when processor 100 switches to first mode 110, some content is read from the storage location into resource mapping unit 114, and when processor 100 switches out first mode 110, the content in resource mapping unit 114 can be written to the storage location, thereby implementing the mapping between resource storage unit 114 and second mode resource storage unit 122.

In some embodiments, when processor 100 is operating in second mode 120, access control interface 130 may monitor the value or data stored in second mode resource storage unit 122 in real time and write the value or the data to a predetermined storage location in the memory space. When processor 100 is operating in first mode 110, the storage location is associated with resource mapping unit 114. For example, when processor 100 switches to first mode 110, some content is read from the storage location into resource mapping unit 114, and when processor 100 switches out first mode 110, the content of resource mapping unit 114 is written to the storage location. When processor 100 switches back to the second mode, the content may be read from the storage location and written into second mode resource storage unit 122, thereby implementing mapping between resource storage unit 114 and second mode resource storage unit 122.

In some embodiments, processor 100 can support operations in first mode 110 and second mode 120 simultaneously. For example, processor 100 can be a multi-core processor in which one or more processor cores can operate in a first mode (e.g., trusted world mode) while one or more other processor cores can operate in a second mode (e.g., non-trusted world mode). In this case, access control interface 130 may use a dedicated storage area in the memory space, monitor values or data stored in second mode resource storage unit 122 in real time, and write the values or the data into the dedicated storage area in the storage space. When processor 100 reads the content in resource mapping unit 114 in first mode 110, the content can be obtained from the dedicated storage area. When the content is written into resource mapping unit 114, the content can also be written into the dedicated storage area and is then synchronized to second mode resource storage unit 122, thereby implementing mapping between resource mapping unit 114 and second mode resource storage unit 122.

The present disclosure is not limited to specific implementations of access control interface 130. All manners in which the mapping relationship between resource mapping unit 114 and second mode resource storage unit 122 may be established are within the scope of the present disclosure.

In some embodiments, processor 100 can support instructions written in a corresponding instruction set and define corresponding instructions or operand forms of resources provided in various operating modes. For example, processor 100 may define a list of resources provided in first mode 110 and a list of resources provided in second mode 120. Moreover, processor 100 may further define an operand form of resource mapping unit 114 in first mode 110. As described above, resource mapping unit 114 may have the same form as that of second mode resource storage unit 122 to be mapped, thereby facilitating instruction processing.

In some embodiments, as shown in FIG. 1, processor 100 can further include an instruction execution unit 140. In some embodiments, instruction execution unit 140 can comprise circuitries. Instruction execution unit 140 can execute decoded instructions. When processor 100 is operating in the first mode, instruction execution unit 140 can execute one or more instructions to access the resources provided in the first mode. When processor 100 is operating in the second mode, instruction execution unit 140 can execute one or more instructions to access the resources provided in the second mode. In some embodiments, when processor 100 is in the first mode, if an instruction includes an access to resource mapping unit 114, instruction execution unit 140 can execute the instruction to access resource mapping unit 114 to further access the content of second mode resource storage unit 122 that is mapped to resource mapping unit 114.

In some embodiments processor 100 can further include a mode identifier 150 to indicate which operating mode processor 100 is currently in. In some embodiments, instruction execution unit 140 may access the processor resources in the corresponding operating mode according to an operating mode (e.g., first or second mode, etc.) indicated by the value of mode identifier 150.

In some embodiments, processor 100 can further include more operating modes. For example, processor 100 may include a third mode 160 or a fourth mode 170. Accordingly, processor 100 can include a third mode resource storage unit 162 or a fourth mode resource storage unit 172. In some embodiments, third mode resource storage unit 162 or fourth mode resource storage unit 172 can comprise circuitries. Third mode resource storage unit 162 can store resources provided when processor 100 is in third mode 160, and fourth mode resource storage unit 172 can store resources provided when processor 100 is in fourth mode 170.

In some embodiments, resource mapping unit 114 may further provide mappings to third mode resource storage unit 162 and fourth mode resource storage unit 172 such that when processor 100 is operating in first mode 110 that has a higher authority, contents respectively stored in second, third, and fourth mode resource storage units 122, 162, and 172 may be accessed via resource mapping unit 114.

Similarly, access control interface 130 can also provide resource mapping unit 114 with an access to third mode resource storage unit 162 and fourth mode resource storage unit 172.

It should be noted that the present disclosure may be extended to processor 100 having more modes, and by providing a resource mapping unit in a resource storage unit in a higher-authority operating mode, a lower-authority resource storage unit can be mapped, so that processor resources in a lower-authority operating mode may be directly accessed in a higher-authority operating mode.

Figure 2:
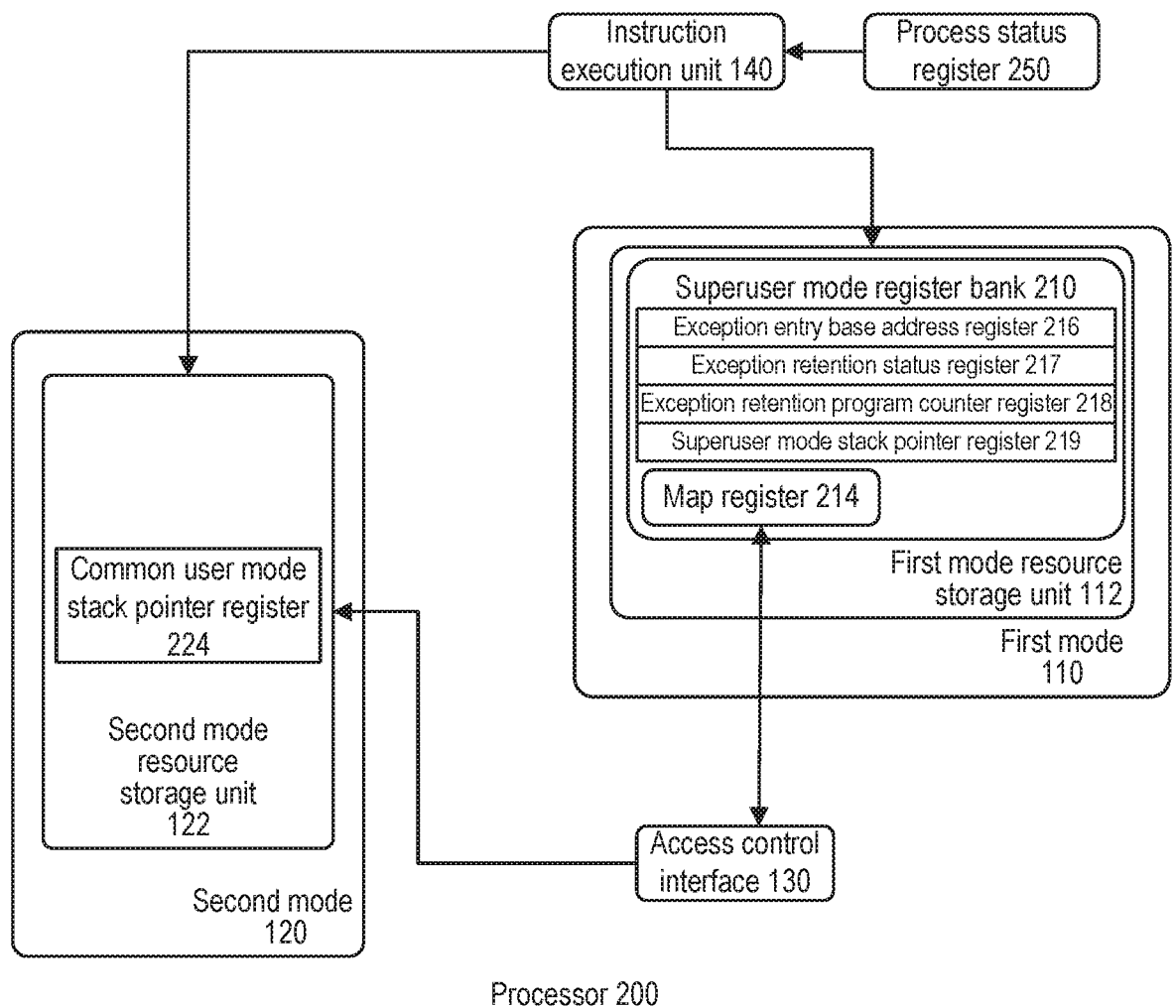
FIG. 2 is a schematic diagram of a processor configured to operate in two modes, according to some embodiments of the present disclosure.

FIG. 2 is a schematic diagram of a processor configured to operate in two modes, according to some embodiments of the present disclosure. In some embodiments, processor 200 shown in FIG. 2 can comprise units or circuitries similar to processor 100. As shown in FIG. 2, processor 200 may operate in two modes. In some embodiments, a first mode 110 can be a superuser mode and a second mode 120 can be an ordinary user mode. A first mode resource storage unit 112 can include a superuser mode register bank 210. In some embodiments, superuser mode register bank 210 can include an exception entry base address register 216, an exception retention status register 217, an exception retention program counter register 218, or a superuser mode stack pointer register 219. Second mode resource storage unit 122 can include an ordinary user mode stack pointer register 224. Resource mapping unit 114 can be a map register 214 in the superuser mode register bank 210 and can map to an ordinary user mode stack pointer register 224 in second mode 120. In some embodiments, map register 214 can be a part of superuser mode register bank 210.

In some embodiments, a mode identifier (e.g., mode identifier 150 described in FIG. 1 and not shown) can be configured as a status bit S stored in a processor status register 250. The value of status bit S can indicate which mode processor 200 is in. For example, when the value of status bit S is 1, processor 200 can be in the superuser mode. When the value of status bit S is 0, processor 200 can be in the ordinary user mode. In some embodiments, instruction execution unit 140 can determine which mode processor 200 is in based on the value of status bit S.

In some embodiments, in the instruction set specification supported by processor 200, the same stack pointer register can be used to store stack pointers in the ordinary user mode and the superuser mode, respectively. When instruction execution unit 140 executes an instruction, if status bit S in processor status register 250 indicates that processor 200 is in the superuser mode, the stack pointer register can be used as superuser mode stack pointer register 219, and a superuser mode stack pointer can be obtained. If status bit S indicates that processor 200 is in the ordinary user mode, the stack pointer register can be used as ordinary user mode stack pointer register 224, and the ordinary user mode stack pointer can be obtained. In some embodiments, if the value of the ordinary user mode stack pointer is to be obtained in the superuser mode, an instruction may be executed to access map register 214 to access the ordinary user mode stack pointer via access control interface 130.

Figure 3:
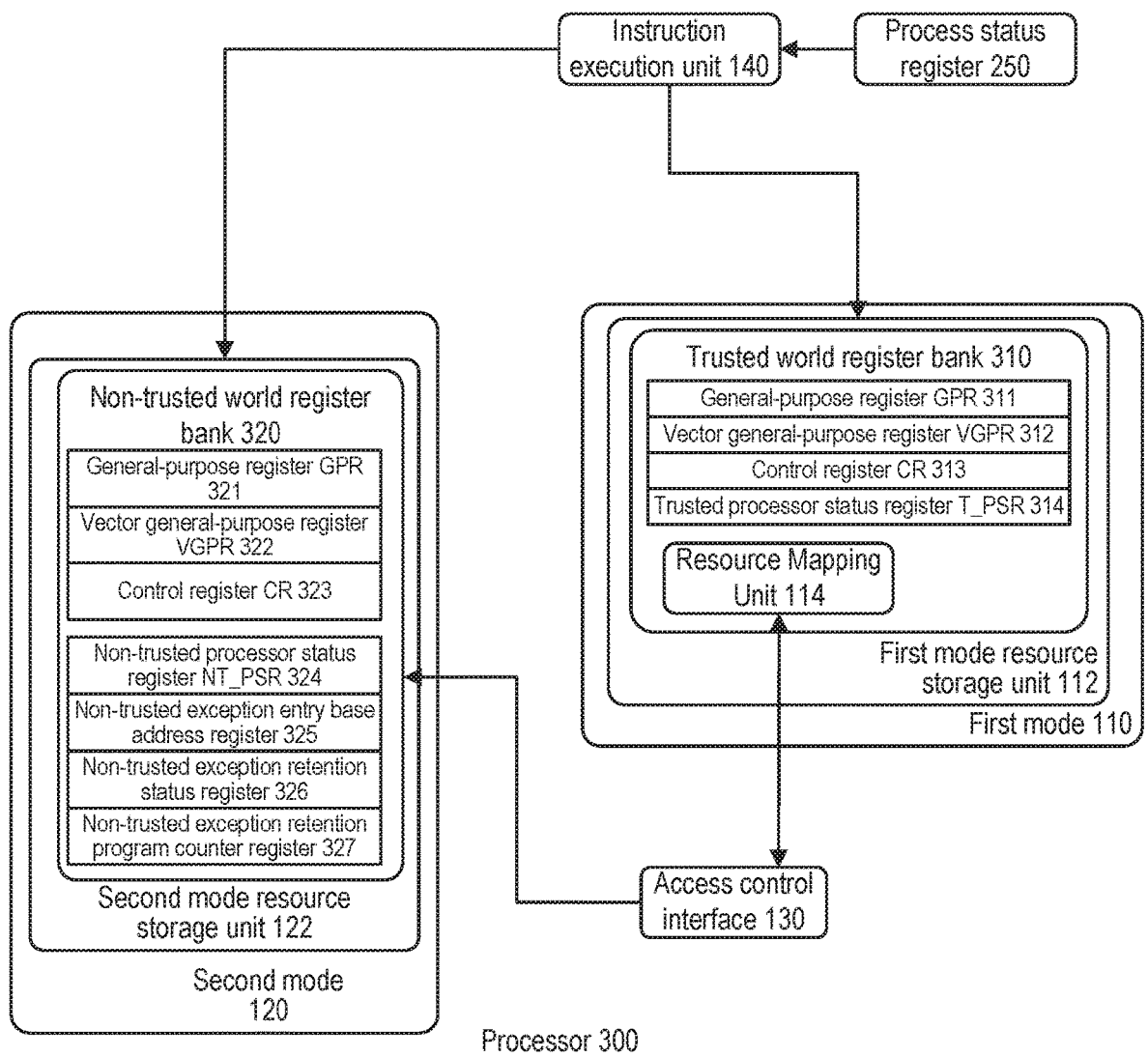
FIG. 3 is a schematic diagram of a processor configured to operate in a trusted world mode and a non-trusted world mode, according to some embodiments of the present disclosure.

FIG. 3 is a schematic diagram of a processor configured to operate in a trusted world mode and a non-trusted world mode, according to some embodiments of the present disclosure. In some embodiments, processor 300 shown in FIG. 3 can comprise units or circuitries similar to processor 100 or processor 200. As shown in FIG. 3, processor 300 may operate in two modes. a first mode 110 can be a trusted world mode and a second mode 120 can be a non-trusted world mode.

A first mode resource storage unit 112 can include a trusted world register bank 310. In some embodiments, trusted world register bank 310 can include a general-purpose register GPR 311, a vector general-purpose register VGPR 312, a control register CR 313, and a trusted processor status register T_PSR 314. A second mode resource storage unit 122 can include a non-trusted world register bank 320. In some embodiments, non-trusted world register bank 320 can include a general-purpose register GPR 321, a vector general-purpose register VGPR 322, a control register CR 323, a non-trusted processor status register NT_PSR 324, a non-trusted world exception entry base address register 325, a non-trusted world exception retention status register 326, and a non-trusted world exception retention program counter register 327. A resource mapping unit 114 can refer to a map register bank or a plurality of map registers in trusted world register bank 310 and may respectively map to non-trusted program status register NT_PSR 324, non-trusted world exception entry base address register 325, non-trusted world exception retention status register 326, and non-trusted world exception retention program counter register 327 in the non-trusted world mode. In some embodiments, resource mapping unit can be a part of trusted world register bank 310.

In some embodiments, a mode identifier (e.g., mode identifier 150 described in FIG. 1, not shown) can be configured as a status bit T of the processor status register to indicate which mode processor 300 is in. For example, when the value of status bit T is 1, processor 300 can be in the trusted world mode, and when the value of status bit T bit is 0, processor 300 can be in the non-trusted world mode. In some embodiments, instruction execution unit 140 can determine which mode processor 300 is in based on the value of status bit T.

In some embodiments, processor 300 can further include a trusted processor status register T_PSR 314 in trusted world mode, and a non-trusted program status register NT_PSR 324 in non-trusted world mode. In some embodiments, these two registers can have essentially the same structure and may provide an access in the same logical way (e.g., under the name of the processor status register PSR). That is, in the case where processor 300 is in the trusted world mode, when an instruction in processor 300 accesses processor status register PSR, the instruction accesses trusted processor status register T_PSR 314. In the case where processor 300 is in the non-trusted world mode, when an instruction in processor 300 accesses PSR, the instruction accesses non-trusted processor status register NT_PSR 324.

Trusted processor status register T_PSR 314 and non-trusted processor status register NT_PSR 324 each have a trusted world status bit T as a mode identifier. The value of trusted world status bit T can indicate which mode processor 300 is in. For example, when the value of trusted world status bit T is 1, it is indicated that processor 300 is in the trusted world mode currently. When the value of trusted world status bit T is 0, it is indicated that processor 300 is in the non-trusted world mode currently. In some embodiments, the value of trusted world status bit T of T_PSR 314 can be fixed at 1, while the value of trusted world status bit T of NT_PSR 324 can be fixed at 0.

In some embodiments, when instruction execution unit 140 executes an instruction, if trusted world status bit T in processor status register PSR indicates that processor 300 is in the trusted world mode, trusted world register bank 300 may be accessed. If trusted world status bit T indicates that processor 300 is in the non-trusted world mode, non-trusted world register bank 320 may be accessed. If values stored in some registers in non-trusted world register bank 320 are to be obtained in the trusted world mode, an instruction may be executed to access map registers in map register bank 114 to access corresponding non-trusted world registers in non-trusted world register bank 320 via access control interface 130.

Figure 4:
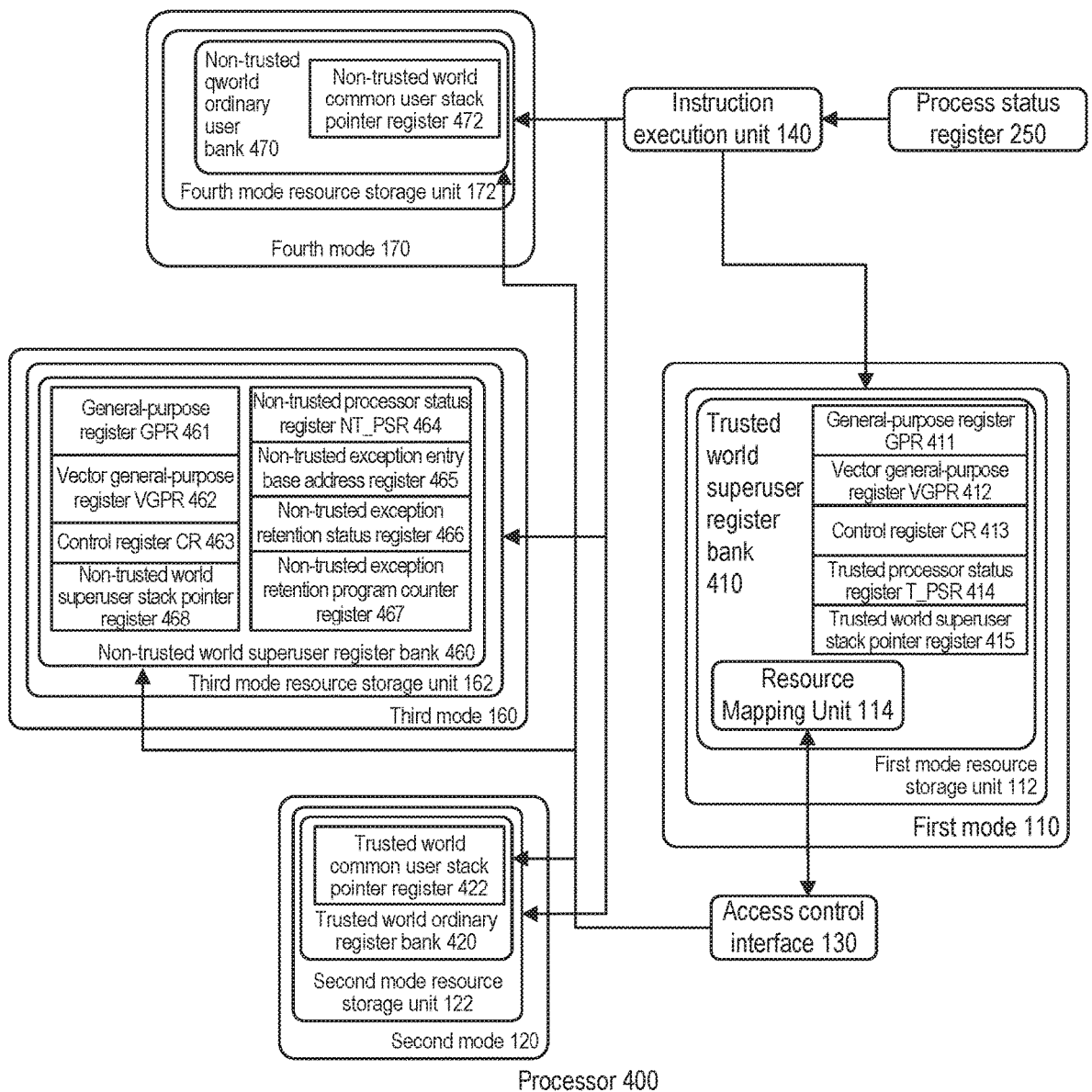
FIG. 4 is a schematic diagram of a processor configured to operate in four different modes, according to some embodiments of the present disclosure.

FIG. 4 is a schematic diagram of a processor configured to operate in four different modes, according to some embodiments of the present disclosure. In some embodiments, processor 400 shown in FIG. 4 can comprise units or circuitry similar to processor 100, processor 200, or processor 300. As shown in FIG. 4, processor 400 may operate in four modes. A first mode 110 can be a trusted world superuser mode. A second mode 120 can be a trusted world ordinary user mode. A third mode 160 can be a non-trusted world superuser mode. A fourth mode 170 can be a non-trusted world ordinary user mode. A first mode resource storage unit 112 can include a trusted world superuser register bank 410. Trusted world superuser register bank 410 can include a general-purpose register GPR 411, a vector general-purpose register VGPR 412, a control register CR 413, a trusted processor status register T_PSR 414, and a trusted world superuser stack pointer register 315.

A second mode resource storage unit 122 can include a trusted world ordinary user register bank 420. The trusted world ordinary user register bank can include a trusted world ordinary user stack pointer register 422.

A third mode resource storage unit 162 can include a non-trusted world superuser register bank 460. Non-trusted world superuser register bank 460 can include a general-purpose register GPR 461, a vector general-purpose register VGPR 462, a control register CR 463, a non-trusted processor status register NT_PSR 464, a non-trusted world exception entry base address register 465, a non-trusted world exception retention status register 466, a non-trusted world exception retention program counter register 467, and a non-trusted world superuser stack pointer register 468. In some embodiments, vector general-purpose register VGPR 462 can correspond to vector general-purpose register VGPR 412 in trusted world superuser register bank 410. Control register CR 463 can correspond to control register CR 413 in trusted world superuser register bank 410. Non-trusted processor status register NT_PSR 464 can correspond to trusted processor status register T_PSR 414 in trusted world superuser register bank 410.

A fourth mode resource storage unit 172 can include a non-trusted world ordinary user register bank 470. Non-trusted world ordinary user register bank can include a non-trusted world ordinary user stack pointer register 472.

A resource mapping unit 114 can refer to a map register bank or a plurality of map registers, which may respectively map to trusted world ordinary user stack pointer register 212 in the trusted world ordinary user mode, non-trusted world processor status register NT_PSR 464 in the non-trusted world superuser mode, non-trusted world exception entry base address register 465 in the non-trusted world superuser mode, the non-trusted world exception retention status register 466 in the non-trusted world superuser mode, non-trusted world exception retention program counter register 467 in the non-trusted world superuser mode, and non-trusted world ordinary user stack pointer register 472 in the non-trusted world ordinary user mode. In some embodiments, resource mapping unit 114 can be a part of trusted world superuser register bank 410.

In some embodiments, a mode identifier (e.g., mode modifier 150 described in FIG. 1 and not shown) can be configured as a status bit T and a status bit S of the processor status register (e.g., status bit T of FIG. 3 and status bit S of FIG. 2). For example, when the value of status bit T is 1 and the value of status bit S is 1, processor 400 can be in the trusted world superuser mode. When the value of status bit T is 1 and the value of status bit S is 0, processor 400 can be in the trusted world ordinary user mode. When the value of status bit T is 0 and the value of status bit S is 1, processor 400 can be in the non-trusted world superuser mode. When the value of status bit T is 0 and value of status bit S is 0, processor 400 can be in the non-trusted world ordinary user mode. A instruction execution unit 140 can determine which mode processor 400 is in based on the values of status bit T and status bit S.

According to the processor architecture of the present disclosure, a resource mapping unit may be provided in a resource storage unit in a higher-authority operating mode to map a resource storage unit in a lower-authority operating mode, so that processor resources in a lower-authority operating mode may be directly accessed in a higher-authority operating mode. Thus, processor resources in a low-authority operating mode may be accessed without mode switching by the processor, thus saving processor overhead.

The processor described above with reference to FIGS. 1-4 may be included in a processing system. The processing system may further include other components such as various interrupt sources, coprocessors, and storage devices. These components together with the processor form a processing system. In some embodiments, the processing system includes a SoC (System on Chip) or the like.

Figure 5:
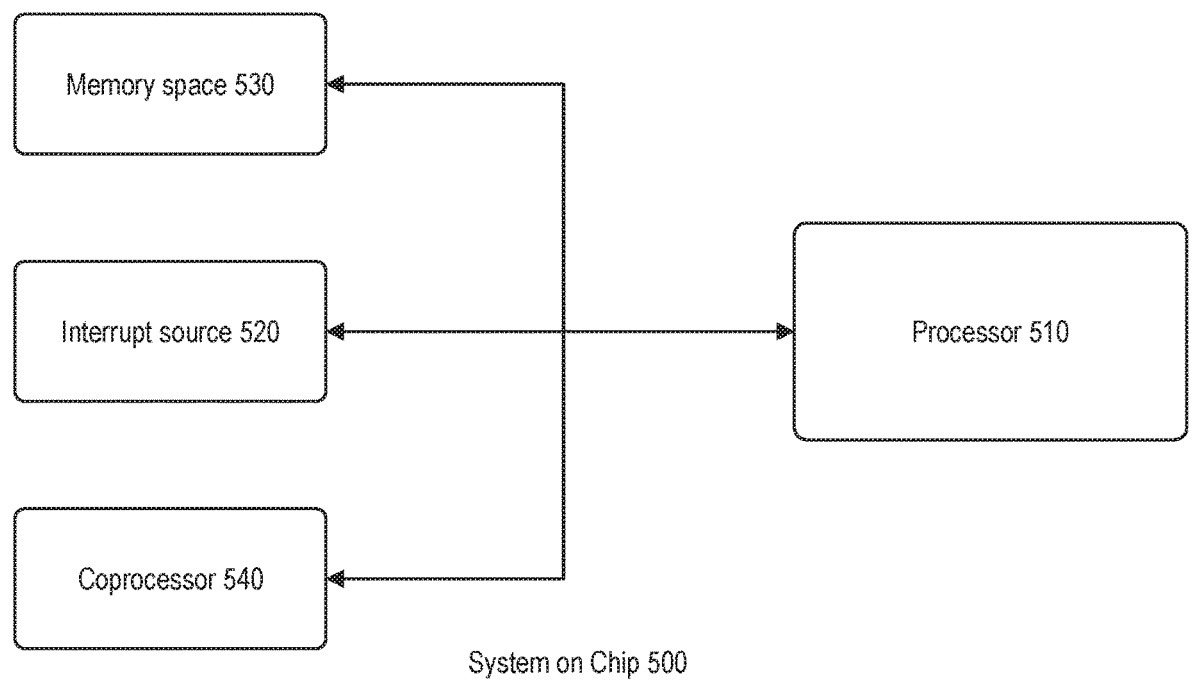
FIG. 5 is a schematic diagram of a system on chip, according to a further embodiment of the present invention.

FIG. 5 is a schematic diagram of a system on chip, according to some embodiments of the present disclosure. As shown in FIG. 5, SoC 500 can include processor 510, various interrupt sources 520, memory space 530, and coprocessor 540 (e.g., such as accelerators). Processors 510 can be any of processors 100-400 described above. In some embodiments, SoC 500 can be integrated on a circuit board and constitutes a relatively complete processing system. Interrupt sources 520 can include, for example, various peripheral interfaces that receive external inputs and output outputs processed by the processors 510. In some embodiments, interrupt sources 520 can also include software-based interrupt sources. Memory space 530 can provide external memory space for processor 510 to store codes to be executed by processor 510 and various output data generated. Coprocessor 540 can be a specialized processor for performing specialized processing tasks, such as image operations.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

The embodiments may further be described using the following clauses:

1. A processor configured to operate in multiple operating modes, the processor comprising:
a first mode resource storage circuitry configured to store first mode resources when the processor is operating in a first mode, wherein the first mode resource storage circuitry comprises a resource mapping circuitry configured to provide second mode resources to the processor operating in the first mode;
a second mode resource storage circuitry configured to store the second mode resources when the processor is operating in a second mode; and
an access control interface communicatively coupled to the resource mapping circuitry and the second mode resource storage circuitry, the access control interface configured to provide the resource mapping circuitry with an access to the second mode resource storage circuitry.

2. The processor according to clause 1, wherein the processor further comprises an instruction execution circuitry configured to execute an instruction to access the first mode resources when the processor is operating in the first mode and to execute an instruction to access the second mode resources when the processor is operating in the second mode.

3. The processor according to clause 2, wherein the instruction execution circuitry is further configured to execute an instruction to access the resource mapping circuitry when the processor is operating in the first mode so that the second mode resources in the second mode resource storage circuitry are accessed via the access control interface.

4. The processor according to any one of clauses 1-3, wherein the first mode resource storage circuitry, the second mode resource storage circuitry, and the resource mapping circuitry are registers.

5. The processor according to any one of clauses 1-4, wherein the first mode is a superuser mode and the second mode is an ordinary user mode.

6. The processor according to clause 5, wherein the first mode resources comprise a superuser mode stack pointer and the second mode resources comprise an ordinary user mode stack pointer.

7. The processor according to any one of clauses 1-4, wherein the first mode is a trusted world mode and the second mode is a non-trusted world mode.

8. The processor according to clause 7, wherein:
the first mode resources comprise one or more of a trusted world stack pointer, a trusted world program status, a trusted world exception entry base address, a trusted world exception retention status, or a trusted world exception retention program counter; and
the second mode resources comprise one or more of a non-trusted world stack pointer, a non-trusted world program status, a non-trusted world exception entry base address, a non-trusted world exception retention status, or a non-trusted world exception retention program counter.

9. The processor according to any one of clauses 3-4, further comprising:
a third mode resource storage circuitry configured to store third mode resources when the processor is operating in a third mode; and
a fourth mode resource storage circuitry configured to store fourth mode resources when the processor is operating in a fourth mode, wherein:
the instruction execution circuitry is further configured to execute an instruction to access the third mode resources when the processor is operating in the third mode, and to execute an instruction to access the fourth mode resources when the processor is operating in the fourth mode;
the resource mapping circuitry is further configured to provide the third and fourth mode resources to the processor operating in the first mode; and
the access control interface is further communicatively coupled to the third mode resource storage circuitry and the fourth mode resource storage circuitry, the access control interface is further configured to provide the resource mapping circuitry with an access to the third mode resource storage circuitry and fourth mode resource storage circuitry.

10. The processor according to clause 9, wherein instruction execution circuitry is further configured to execute an instruction to access the resource mapping circuitry when the processor is operating in the first mode so that the second, third, and fourth mode resources in the respective second mode resource storage circuitry, third mode resource storage circuitry, and fourth mode resource storage circuitry are further accessed via the access control interface.

11. The processor according to clause 9 or 10, wherein the first mode is a trusted world superuser mode, the second mode is a trusted world ordinary user mode, the third mode is a non-trusted world superuser mode, and the fourth mode is a non-trusted world ordinary user mode.

12. The processor according to clause 11, wherein:
the first mode resources comprise one or more of a trusted world superuser stack pointer, a trusted world program status, a trusted world exception entry base address, a trusted world exception retention status and a trusted world exception retention program counter;
the second mode resources comprise a trusted world ordinary user stack pointer;
the third mode resources comprise one or more of a non-trusted world superuser stack pointer, a non-trusted world program status, a non-trusted world exception entry base address, a non-trusted world exception retention status and a non-trusted world exception retention program counter; and
the fourth mode resources comprise a non-trusted world ordinary user stack pointer.

13. A system on chip, comprising,
a processor configured to operate in multiple operating modes, comprising:
a first mode resource storage circuitry configured to store first mode resources when the processor is operating in a first mode, wherein the first mode resource storage circuitry comprises a resource mapping circuitry configured to provide second mode resources to the processor operating in the first mode;
a second mode resource storage circuitry configured to store the second mode resources when the processor is operating in a second mode; and 14. The system on chip of clause 13, further comprising:
a coprocessor communicatively coupled to the processor, the coprocessor configured to perform specialized computing tasks;
a memory space communicatively coupled to the processor, the memory space configured to store codes to be executed by the processor and various output data generated by the processor; and
one or more interrupt sources communicatively coupled to the processor.

15. A processor configured to operate in multiple operating modes, comprising:
an ordinary user mode stack pointer register configured to store a stack pointer when the processor is operating in an ordinary user mode;
a superuser mode register bank configured to store values of registers when the processor is operating in a superuser mode, the superuser register bank comprising a map register configured to provide the ordinary user stack pointer to the processor when the processor is operating in the superuser mode; and
an access control interface communicatively coupled to the map register and the ordinary user stack pointer register, the access control interface configured to provide the map register with an access to the ordinary user stack pointer register.

16. The processor according to clause 15, further comprising a processor status register including a mode identifier bit to indicate whether the processor is in an ordinary user mode or a superuser mode.

17. The processor according to clause 16, further comprising an instruction execution circuitry configured to determine, according to the value of the mode identifier bit, whether the processor is in an ordinary user mode or a superuser mode, wherein when the processor is in the superuser mode, the instruction execution circuitry is further configured to execute an instruction to access the map register so that the ordinary user stack pointer in the ordinary user stack pointer register is accessed via the access control interface.

18. A system on chip, comprising:
a processor configured to operate in multiple operating modes, comprising:
an ordinary user mode stack pointer register configured to store a stack pointer when the processor is operating in an ordinary user mode;
a superuser mode register bank configured to store values of registers when the processor is operating in a superuser mode, the superuser register bank comprising a map register configured to provide the ordinary user stack pointer to the processor when the processor is operating in the superuser mode; and
an access control interface communicatively coupled to the map register and the ordinary user stack pointer register, the access control interface configured to provide the map register with an access to the ordinary user stack pointer register.

19. The system on chip of clause 18, further comprising:
a coprocessor communicatively coupled to the processor, the coprocessor configured to perform specialized computing tasks;
a memory space communicatively coupled to the processor, the memory space configured to store codes to be executed by the processor and various output data generated by the processor; and
one or more interrupt sources communicatively coupled to the processor.

20. A processor configured to operate in multiple operating modes, comprising:
a non-trusted world register bank configured to store values of registers when the processor is operating in a non-trusted world mode;
a trusted world register bank configured to store values of registers when the processor is in operating a trusted world mode, the trusted world register bank comprising a map register configured to provide the values of non-trusted world registers in the non-trusted world register bank to the processor when the processor is operating in the trusted world mode; and
an access control interface communicatively coupled to the map register and the non-trusted world register, the access control interface configured to provide the map register with an access to the non-trusted world register.

21. The processor of clause 20, further comprising a processor status register including a trusted identifier bit to indicate whether the processor is in a non-trusted world mode or a trusted world mode.

22. The processor of clause 21, further comprising an instruction execution circuitry configured to determine, according to the value of the trusted identifier bit, whether the processor is in a trusted world mode or a non-trusted world mode, and when the processor is in the trusted world mode, execute an instruction to access the map register so that a register value in the non-trusted world register is accessed via the access control interface.

23. A system on chip, comprising:
a processor configured to operate in multiple operating modes, comprising:
a non-trusted world register bank configured to store values of registers when the processor is operating in a non-trusted world mode;
a trusted world register bank configured to store values of registers when the processor is in operating a trusted world mode, the trusted world register bank comprising a map register configured to provide the values of non-trusted world registers in the non-trusted world register bank to the processor when the processor is operating in the trusted world mode; and
an access control interface communicatively coupled to the map register and the non-trusted world register, the access control interface configured to provide the map register with an access to the non-trusted world register.

24. The system on chip of clause 23, further comprising:
a coprocessor communicatively coupled to the processor, the coprocessor configured to perform specialized computing tasks;
a memory space communicatively coupled to the processor, the memory space configured to store codes to be executed by the processor and various output data generated by the processor; and
one or more interrupt sources communicatively coupled to the processor.

In the drawings and specification, there have been disclosed exemplary embodiments. Many variations and modifications, however, can be made to these embodiments. Accordingly, although specific terms are employed, they are used in a generic and descriptive sense only and not for purposes of limitation, the scope of the embodiments being defined by the following claims.

What is claimed is:

1. A processor configured to operate in multiple operating modes, the processor comprising:
   a first mode resource storage circuitry configured to store first mode resources when the processor is operating in a first mode, wherein the first mode resource storage circuitry comprises a resource mapping circuitry configured to provide second mode resources to the processor operating in the first mode;
   a second mode resource storage circuitry configured to store the second mode resources when the processor is operating in a second mode; and
   an access control interface communicatively coupled to the resource mapping circuitry and the second mode resource storage circuitry, the access control interface configured to provide the resource mapping circuitry with an access to the second mode resource storage circuitry.

2. The processor according to claim 1, wherein the processor further comprises an instruction execution circuitry configured to execute a first instruction to access the first mode resources when the processor is operating in the first mode and to execute a second instruction to access the second mode resources when the processor is operating in the second mode.

3. The processor according to claim 2, wherein the instruction execution circuitry is further configured to execute a third instruction to access the resource mapping circuitry when the processor is operating in the first mode so that the second mode resources in the second mode resource storage circuitry are accessed via the access control interface.

4. The processor according to claim 1, wherein the first mode resource storage circuitry, the second mode resource storage circuitry, and the resource mapping circuitry are registers.

5. The processor according to claim 1, wherein the first mode is a superuser mode and the second mode is an ordinary user mode.

6. The processor according to claim 5, wherein the first mode resources comprise a superuser mode stack pointer and the second mode resources comprise an ordinary user mode stack pointer.

7. The processor according to claim 1, wherein the first mode is a trusted world mode and the second mode is a non-trusted world mode.

8. The processor according to claim 7, wherein:
   the first mode resources comprise one or more of a trusted world stack pointer, a trusted world program status, a trusted world exception entry base address, a trusted world exception retention status, or a trusted world exception retention program counter; and
   the second mode resources comprise one or more of a non-trusted world stack pointer, a non-trusted world program status, a non-trusted world exception entry base address, a non-trusted world exception retention status, or a non-trusted world exception retention program counter.

9. The processor according to claim 3, further comprising:
   a third mode resource storage circuitry configured to store third mode resources when the processor is operating in a third mode; and
   a fourth mode resource storage circuitry configured to store fourth mode resources when the processor is operating in a fourth mode, wherein:
   the instruction execution circuitry is further configured to execute a fourth instruction to access the third mode resources when the processor is operating in the third mode, and to execute a fifth instruction to access the fourth mode resources when the processor is operating in the fourth mode;
   the resource mapping circuitry is further configured to provide the third and fourth mode resources to the processor operating in the first mode; and
   the access control interface is further communicatively coupled to the third mode resource storage circuitry and the fourth mode resource storage circuitry, the access control interface is further configured to provide the resource mapping circuitry with an access to the third mode resource storage circuitry and fourth mode resource storage circuitry.

10. The processor according to claim 9, wherein the instruction execution circuitry is further configured to execute a sixth instruction to access the resource mapping circuitry when the processor is operating in the first mode so that the second, third, and fourth mode resources in the respective second mode resource storage circuitry, third mode resource storage circuitry, and fourth mode resource storage circuitry are further accessed via the access control interface.

11. The processor according to claim 9, wherein the first mode is a trusted world superuser mode, the second mode is a trusted world ordinary user mode, the third mode is a non-trusted world superuser mode, and the fourth mode is a non-trusted world ordinary user mode.

12. The processor according to claim 11, wherein:
   the first mode resources comprise one or more of a trusted world superuser stack pointer, a trusted world program status, a trusted world exception entry base address, a trusted world exception retention status and a trusted world exception retention program counter;
   the second mode resources comprise a trusted world ordinary user stack pointer;
   the third mode resources comprise one or more of a non-trusted world superuser stack pointer, a non-trusted world program status, a non-trusted world exception entry base address, a non-trusted world exception retention status and a non-trusted world exception retention program counter; and
   the fourth mode resources comprise a non-trusted world ordinary user stack pointer.

13. A system on chip, comprising,
   a processor configured to operate in multiple operating modes, comprising:
   a first mode resource storage circuitry configured to store first mode resources when the processor is operating in a first mode, wherein the first mode resource storage circuitry comprises a resource mapping circuitry configured to provide second mode resources to the processor operating in the first mode;
   a second mode resource storage circuitry configured to store the second mode resources when the processor is operating in a second mode; and
   an access control interface communicatively coupled to the resource mapping circuitry and the second mode resource storage circuitry, the access control interface configured to provide the resource mapping circuitry with an access to the second mode resource storage circuitry.

14. The system on chip of claim 13, further comprising:
a coprocessor communicatively coupled to the processor, the coprocessor configured to perform specialized computing tasks;
a memory space communicatively coupled to the processor, the memory space configured to store codes to be executed by the processor and various output data generated by the processor; and
one or more interrupt sources communicatively coupled to the processor.

15. A processor configured to operate in multiple operating modes, comprising:
an ordinary user mode stack pointer register configured to store a stack pointer when the processor is operating in an ordinary user mode;
a superuser mode register bank configured to store values of registers when the processor is operating in a superuser mode, the superuser register bank comprising a map register configured to provide the ordinary user stack pointer to the processor when the processor is operating in the superuser mode; and
an access control interface communicatively coupled to the map register and the ordinary user stack pointer register, the access control interface configured to provide the map register with an access to the ordinary user stack pointer register.

16. The processor according to claim 15, further comprising a processor status register including a mode identifier bit to indicate whether the processor is in an ordinary user mode or a superuser mode.

17. The processor according to claim 16, further comprising an instruction execution circuitry configured to determine, according to the value of the mode identifier bit, whether the processor is in an ordinary user mode or a superuser mode, wherein when the processor is in the superuser mode, the instruction execution circuitry is further configured to execute an instruction to access the map register so that the ordinary user stack pointer in the ordinary user stack pointer register is accessed via the access control interface.

18. A processor configured to operate in multiple operating modes, comprising:
a non-trusted world register bank configured to store values of registers when the processor is operating in a non-trusted world mode;
a trusted world register bank configured to store values of registers when the processor is in operating a trusted world mode, the trusted world register bank comprising a map register configured to provide the values of non-trusted world registers in the non-trusted world register bank to the processor when the processor is operating in the trusted world mode; and
an access control interface communicatively coupled to the map register and the non-trusted world register, the access control interface configured to provide the map register with an access to the non-trusted world register.

19. The processor of claim 18, further comprising a processor status register including a trusted identifier bit to indicate whether the processor is in a non-trusted world mode or a trusted world mode.

20. The processor of claim 19, further comprising an instruction execution circuitry configured to determine, according to the value of the trusted identifier bit, whether the processor is in a trusted world mode or a non-trusted world mode, and when the processor is in the trusted world mode, execute an instruction to access the map register so that a register value in the non-trusted world register is accessed via the access control interface.

* * * * *